Aug. 2, 1949.   S. H. M. DODINGTON   2,477,585
PULSE SHAPE MODIFYING CIRCUIT
Filed Oct. 10, 1945   2 Sheets-Sheet 1

INVENTOR.
SVEN H. M. DODINGTON
BY
ATTORNEY

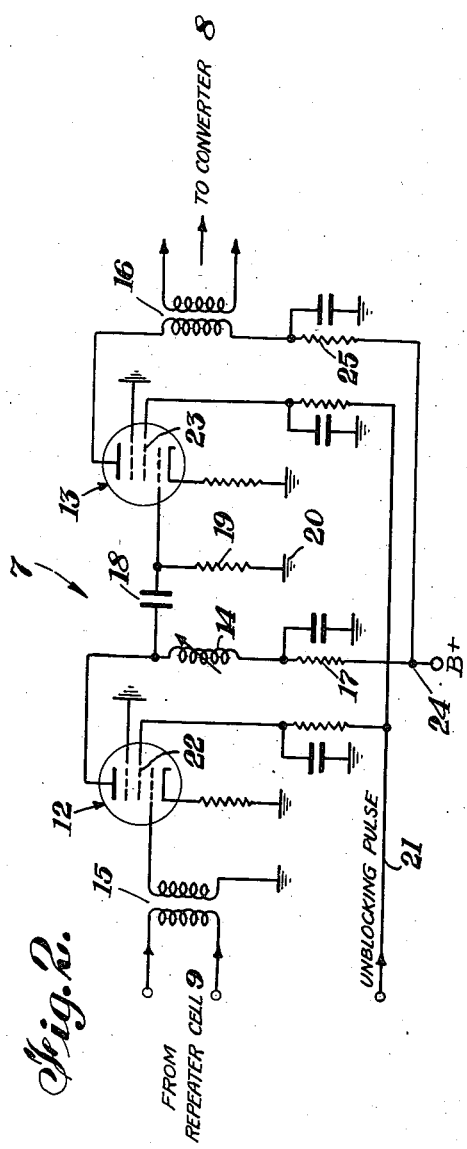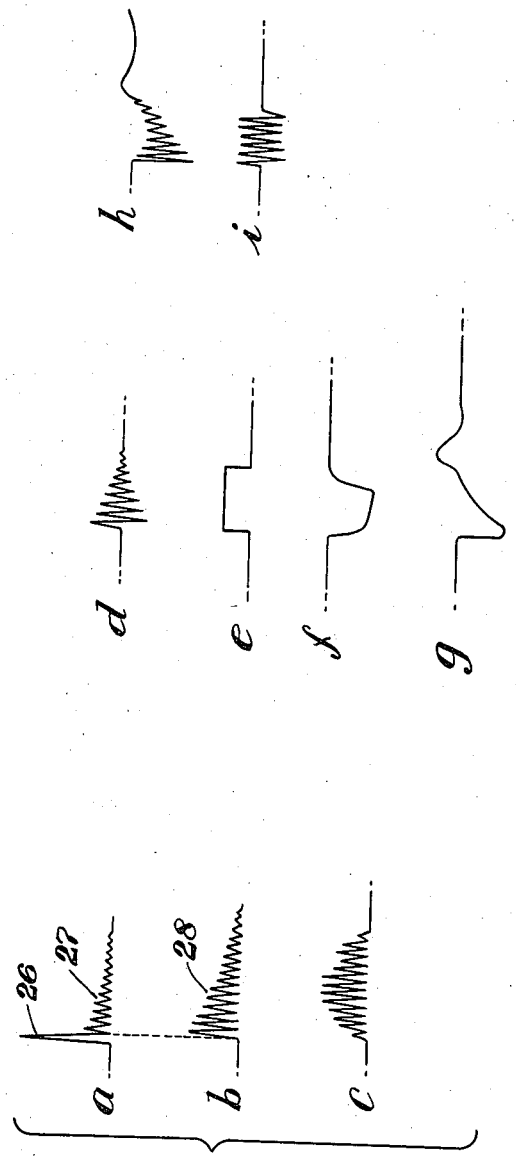

Patented Aug. 2, 1949

2,477,585

UNITED STATES PATENT OFFICE 2,477,585

PULSE SHAPE MODIFYING CIRCUIT

Sven H. M. Dodington, Nutley, N. J., assignor to Federal Telephone and Radio Corporation, New York, N. Y., a corporation of Delaware Application October 10, 1945, Serial No. 621,578

10 Claims. (Cl. 250—27)

This invention relates to circuits for modifying the shape of pulses and more particularly to circuits to be used for modifying the shape of a series of significant pulse waves as for instance encountered in radio obstacle detection systems and the like.

In my copending application, Ser. No. 551,470, filed: August 28, 1944, I disclose a system for intercepting radio impulses transmitted by radio locating systems and for transmitting in response thereto simulated reflections as might be obtained from obstacles such as aircraft and ships. The receiver of the system includes a pulse repeating system which upon the reception of a transmitted impulse produces a series of significant pulses which are sent out in simulation of reflected pulses that might be expected from the normal reflection characteristics of an object or group of objects.

It is an object of the present invention to provide an improved means for producing the simulated reflection pulses to more closely resemble actual reflection pulses.

It is another object of the present invention to provide a circuit for modifying the shape of a series of significant pulses.

It is another object to provide a circuit for shaping a series of pulses which have been produced in response to a transmitted impulse so as to simulate the reflections that might be expected of a given number of ships or aircraft.

In accordance with my present invention, I provide for a system which produces simulated reflection pulses as disclosed in the aforesaid application, a double stage intermediate frequency amplifier which is arranged to be keyed on by the application of a square wave to the screens of the amplifying tubes thereof. The unblocking pulse is applied to the first stage of the amplifier simultaneously with the application of the wave of simulated reflection pulses. The applied unblocking pulse is also subjected to the action of a differentiating circuit which is arranged to affect the bias of the second stage whereby the resultant output thereof is modified in amplitude in accordance with the differentiated value of the said unblocking pulse. As a consequence the normally strong reflections at the start of the pulse wave are reduced in amplitude to simulate the exact characteristics of actual reflection pulses. By the proper proportioning of various circuit parameters most any desired shape of the ultimate pulse waves may be obtained.

These and other features and objects of this invention will become more apparent upon consideration of the following detailed description of an embodiment to be read in connection with the following drawings in which:

Fig. 2 is a schematic representation of an intermediate frequency amplifier as used in the circuit of Fig. 1; and Fig. 3 is a series of graphs representing voltages and pulses at various points in the amplifier of Fig. 2.

Figure 1:
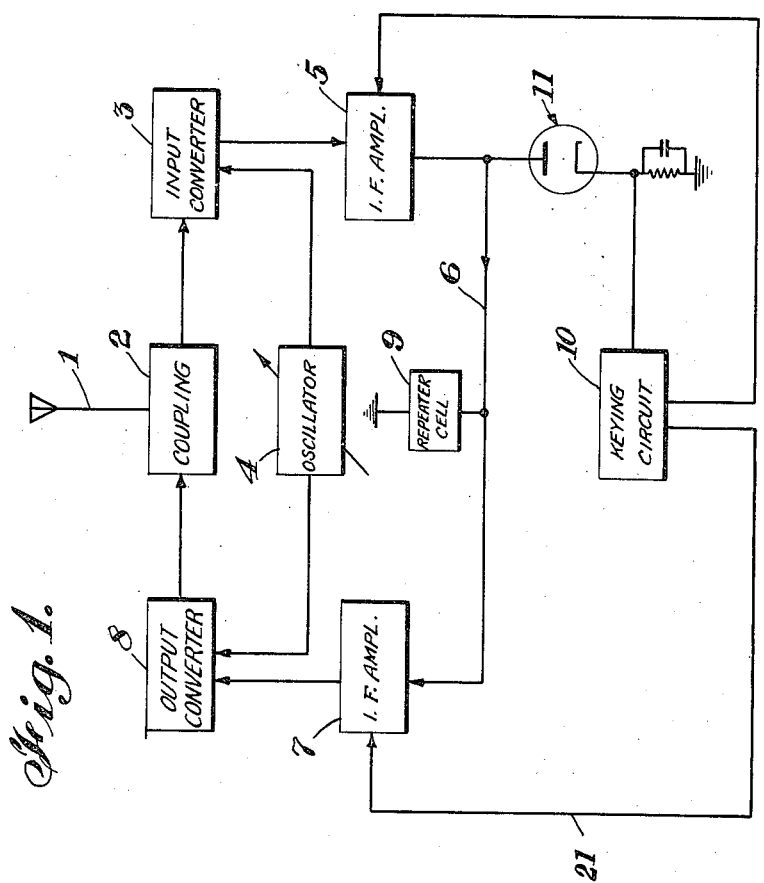
Fig. 1 is a block diagram of a simulating pulse repeater incorporating an amplifier in accordance with my invention.

Referring now to the drawings the repeater system of Fig. 1 which has been fully described in my copending application, Ser. No. 551,470 referred to hereinabove, comprises a two-way antenna 1 which is connected to a transmitter-receiver comprised of a coupling unit 2 connected to an input converter 3 wherein the radio frequency or ultra-high frequency of the carrier of the incoming radio pulses is beat down to a supersonic frequency by heterodyning against the output of a local oscillator 4 for application to a wide band intermediate frequency amplifier stage 5. Connected to an output connection 6 of the intermediate frequency stage 5 is an output intermediate frequency amplifier 7 which feeds into an output converter 8. Here, the intermediate frequency carrier energy to which has been added simulated repeat pulse energy from a supersonic repeat pulse generating device or cell 9, in accordance with the showing in the aforesaid application Serial No. 551,470, and coupled to the output connection 6, is reconverted to the original incoming impulse carrier frequency by heterodyning against the output of the oscillator 4. The output converter 8 is connected to supply the coupling unit 2 feeding into the antenna 1 now functioning in its transmission capacity. A keying circuit 10 receiving a controlled impulse from a demodulator 11 of the output of the amplifier 5 supplies a suitable keying potential both to the output amplifier 7 and to the input amplifier 5 for the unblocking and blocking of the operation of the two amplifiers respectively. This has the purpose of providing the proper sequence of reception and transmission for the system as a whole. It is to be understood, of course, that the demodulator 11 may be of any suitable form capable of performing the keying function as outlined. The keying pulses themselves may be obtained from circuits such as a multivibrator circuit which is triggered by the incoming impulse as disclosed in my copending application, Ser. No. 480,603, filed March 26, 1943.

Referring now to Fig. 2 the intermediate frequency output amplifier 7 of Fig. 1, shown here in detailed schematic form is comprised basically of an intermediate frequency amplifier with alternate singly and doubly tuned stages as disclosed in the U. S. Patent No. 2,357,442, issued to me on September 5, 1944. Two amplifying stages in the form of two pentodes 12 and 13 are coupled by means of a single tuned interstage coupling coil 14, the input and the output to the circuit being obtained over doubly tuned coupling coils or transformers 15 and 16 respectively. The tuning of the single interstage coil 14 may be accomplished by known arrangements of any suitable type such as a variometer or known plunger-tuned coil, as disclosed in the said Patent No. 2,357,442. The double coils 15 and 16 may be of a conventional predetermined fixed design tuned to operate within a specified frequency band, distributed capacities being sufficient to tune the coils without the use of bridging trimmer condensers. Other circuit elements are of such rating as to produce in cooperation with the coils a frequency response curve in accordance with the respective requirements. The circuit incorporates certain gain modifying elements which includes a decoupling resistance 17 in the plate circuit of the pentode 12; a condenser 18 between the coupling coil 14 and the pentode 13, and a resistance 19 in the circuit from the condenser 18 to ground at 20. An unblocking pulse is applied from circuit 10 over a connection 21 to screen grids 22 and 23 of the pentodes 12 and 13, respectively. The plates of the pentodes 12 and 13 are energized from a source of B+ at 24, the former over the resistance 17 and the latter over a resistance 25. The input to the tube 12, as available in the primary of the transformer 15, is shown in graph $a$ and includes an incoming pulse 26 and pulse reflections 27 as obtained from the repeater cell 9. As the tube 12 is unblocked by the square wave of graph $e$ which is timed so as to eliminate the incoming pulse 26, the simulated reflection pulses 27 are amplified to appear in the plate circuit of the tube 12 as shown at 28 in graph $b$. It is desirable, however, to reshape the pulses of graph $b$ so as to attenuate the leading pulses as indicated in graph $c$ which illustrates closely the true reflections of a group of obstacles such as a squadron of aircraft or ships. This reshaping will now be described.

The resulting intermediate frequency voltage across the tuning coil 14 will appear as shown in graph $d$. The application of the positive square wave (graph $e$) to the screen 22 apart from making the tube 12 operative causes a negative square wave to be established across the resistance 17 in accordance with the form shown in graph $f$. This negative square wave undergoes a differentiation in the circuit formed by the capacity 18 and the resistance 19 to assume a form in accordance with graph $g$. Accordingly the tube 13 becomes biased somewhat negatively at the start of the transmission cycle whereby its gain is reduced. The resulting voltage on the grid of tube 13 combining the applied series of reflection pulses as at $d$ and the differentiated unblocking pulse in accordance with graph $g$ will take the form shown in graph $h$. The final form of the pulse series as it will appear in the secondary of the transformer 16 will take the form indicated in graph $i$. By unblocking tube 13 with the unblocking pulses from line 21, the output from transformer 16 associated with tube 13 is produced only during the unblocking intervals, regardless of what transient or noise effects may be present in the previous stage between the blocking intervals.

It is thus seen that the gain in the tube 13 is modified so that the strong reflections at the start of transmission are reduced in amplitude. By suitably proportioning the resistances 17 and 19 and the condenser 18 almost any desired resultant shape of the pulse series may be obtained as for instance suggested in graph $c$ which shows a series of pulses as they are normally desired in order to suitably simulate reflections from a group of obstacles. These latter are, of course, obtained after subjecting the pulses in the secondary of the transformer 16 to operations which will eliminate their effective negative portions.

Although I have described my invention in connection with simulated radio obstacle detection systems, it will, of course, be apparent that the pulse shape modifying system here disclosed is equally usable in connection with any other application which calls for the reshaping of one or more pulses in accordance with the method disclosed.

While I have described above the principles of my invention in connection with specific apparatus it is to be clearly understood that this description is made only by way of example and not as a limitation of the scope of my invention as defined in the objects and the accompanying claims.

I claim:

1. A circuit for modifying the shape of pulse waves applied thereto, comprising means for amplifying pulse waves on a carrier of a certain frequency, means for rendering operative said amplifying means by the application thereto of a periodic unblocking wave, and means included in said amplifying means to change the shape of said unblocking wave and to combine the changed unblocking wave with the amplified pulse waves.

2. A circuit according to claim 1 wherein said amplifying means comprises a first and a second amplifying stage, and said means for rendering operative said amplifying means is connected to said first and said second stage.

3. A circuit according to claim 1 wherein said amplifying means comprises a first and a second amplifying stage, and the means for changing the shape of the unblocking wave is included in the coupling between said two stages.

4. A circuit according to claim 1 wherein said amplifying means comprises a first and a second amplifying stage, said first stage including a coupling inductance across which is derived a voltage wave which is substantially the inverse of the said unblocking wave.

5. A circuit according to claim 1 wherein said amplifying means comprises a first and a second amplifying stage, said first stage including a coupling inductance across which is derived a voltage wave which is substantially the inverse of the said unblocking wave, and said means to change shape of the unblocking wave includes a differentiating circuit included in the coupling between said two stages, whereby the inverse voltage wave produced by differentiation is applied to said second stage together with the amplified pulse waves.

6. A circuit for modifying the shape of pulse waves applied thereto comprising input coupling means, a first amplifying stage, a second amplifying stage, output coupling means for said second stage, interstage coupling means intermediate said two stages, a differentiating circuit between said interstage coupling means and said second stage, and means for applying an unblocking voltage wave to said first and second stages.

7. A circuit according to claim 6 wherein said input and said output means comprise double coil means and said interstage coupling means comprises single coil means.

8. A circuit according to claim 6 wherein said first and said second stages each comprise a pentode, the plate circuit of said first stage including a coupling inductance across which a voltage from said unblocking wave is derived.

9. A circuit according to claim 6 wherein said first and second stages each comprise a pentode, said means for applying an unblocking wave being connected to certain grids of said two pentodes.

10. A circuit for modifying the shape of pulse waves applied thereto on a certain carrier frequency, comprising a tuned frequency input transformer, a first pentode amplifying stage, a second pentode amplifying stage, an interstage single coupling coil intermediate said pentodes, a decoupling resistance in the plate circuit of said first pentode, a voltage differentiating circuit intermediate said single coupling coil and said second pentode a tuned frequency output transformer for said second pentode, and circuit means for applying an unblocking voltage wave to certain grids of said pentodes.

SVEN H. M. DODINGTON.

REFERENCES CITED

The following references are of record in the file of this patent:

UNITED STATES PATENTS

| Number | Name | Date |
| --- | --- | --- |
| 2,132,655 | Smith | Oct. 11, 1938 |
| 2,138,577 | Gray | Nov. 29, 1938 |
| 2,251,973 | Beale et al. | Aug. 12, 1941 |
| 2,273,193 | Heising | Feb. 17, 1942 |
| 2,337,522 | Eldredge | Dec. 21, 1943 |
| 2,423,304 | Fitch | July 1, 1947 |
| 2,431,324 | Grieg | Nov. 25, 1947 |
| 2,438,904 | DeRosa | Apr. 6, 1948 |

OTHER REFERENCES

Ultra High Frequency Techniques, by Brainerd et al., July 1942, chapter 3. (Copy in Division 51.)